(12) United States Patent
Hofbauer (10) Patent No.: US 8,746,204 B2
(45) Date of Patent: Jun. 10, 2014

(54) FRICTIONLESS ROCKING JOINT

(75) Inventor: Peter P. Hofbauer, West Bloomfield, MI (US)

(73) Assignee: EcoMotors, Inc., Allen Park, MI (US)

( * ) Notice: Subject to any disclaimer, the term of this patent is extended or adjusted under 35 U.S.C. 154(b) by 286 days.

(21) Appl. No.: 13/232,041

(22) Filed: Sep. 14, 2011

(65) Prior Publication Data

US 2012/0073538 A1    Mar. 29, 2012

Related U.S. Application Data

(60) Provisional application No. 61/387,881, filed on Sep. 29, 2010, provisional application No. 61/501,557, filed on Jun. 27, 2011.

(51) Int. Cl.
*F02B 75/32* (2006.01)
*F16C 9/04* (2006.01)

(52) U.S. Cl.
CPC .................................. *F16C 9/04* (2013.01)
USPC ......... 123/197.4; 123/51 R; 74/594; 384/216; 384/430

(58) Field of Classification Search
CPC ............ F02B 75/28; F02B 75/32; F01B 7/04; F01B 7/06; F01B 7/08; F16C 9/04
USPC .............. 123/197.4, 197.1, 51 R, 51 A, 51 B, 123/51 BC; 74/44, 579 R, 594; 384/216, 384/268, 270, 430
See application file for complete search history.

(56) References Cited

U.S. PATENT DOCUMENTS

| | | | | |
|---|---|---|---|---|
| 546,055 | A * | 9/1895 | Pitt | 91/493 |
| 658,557 | A * | 9/1900 | Pitt | 74/55 |
| 1,107,837 | A * | 8/1914 | Pitt | 74/55 |
| 2,260,240 | A | 10/1941 | Taylor | |
| 4,459,945 | A * | 7/1984 | Chatfield | 123/55.3 |
| 4,516,539 | A * | 5/1985 | Andreen | 123/51 B |
| 4,869,212 | A * | 9/1989 | Sverdlin | 123/51 B |
| 5,115,725 | A | 5/1992 | Horiuchi | |
| 5,372,554 | A | 12/1994 | Okuda | |
| 5,685,267 | A | 11/1997 | Wiczynski et al. | |
| 5,711,267 | A * | 1/1998 | Williams | 123/197.4 |
| 6,170,443 | B1 | 1/2001 | Hofbauer | |
| 7,434,550 | B2 | 10/2008 | Hofbauer | |
| 2002/0088426 | A1 | 7/2002 | Towler | |

FOREIGN PATENT DOCUMENTS

GB            312936 A     2/1930
WO          9819067 A1    5/1998

* cited by examiner

*Primary Examiner* — Noah Kamen
*Assistant Examiner* — Grant Moubry
(74) *Attorney, Agent, or Firm* — Diana D. Brehob (57) ABSTRACT

Reciprocating motion can be converted to rotary motion through a crankshaft and a connecting rod. In a joint between a connecting rod and a piston, the connecting rod rocks with respect to the piston. In some situations, the connecting rod is a pullrod always in tension or a pushrod always in compression making it difficult to lubricate the bearing surfaces. A joint is disclosed in which the bearing surfaces rock with respect to each other with no sliding between the surfaces. The connecting rod has a bearing surface that is part of a cylinder having a radius equal to a distance between a central axis of the journal to which the connecting rod is coupled and the bearing surface. The pin has a convexly- or concavely-curved bearing surface and the local radius is based on material properties and the local peak force that the rocking joint is designed to transmit.

27 Claims, 9 Drawing Sheets

FRICTIONLESS ROCKING JOINT

The present application claims priority benefit from U.S. provisional patent applications 61/387,881 filed 29 Sep. 2010 and 61/501,557 filed 27 Jun. 2011.

FIELD

The present disclosure relates to the field of machines in which linear motion is converted to rotational motion and in particular to connections between connecting rods and pins.

BACKGROUND

Figure 1:
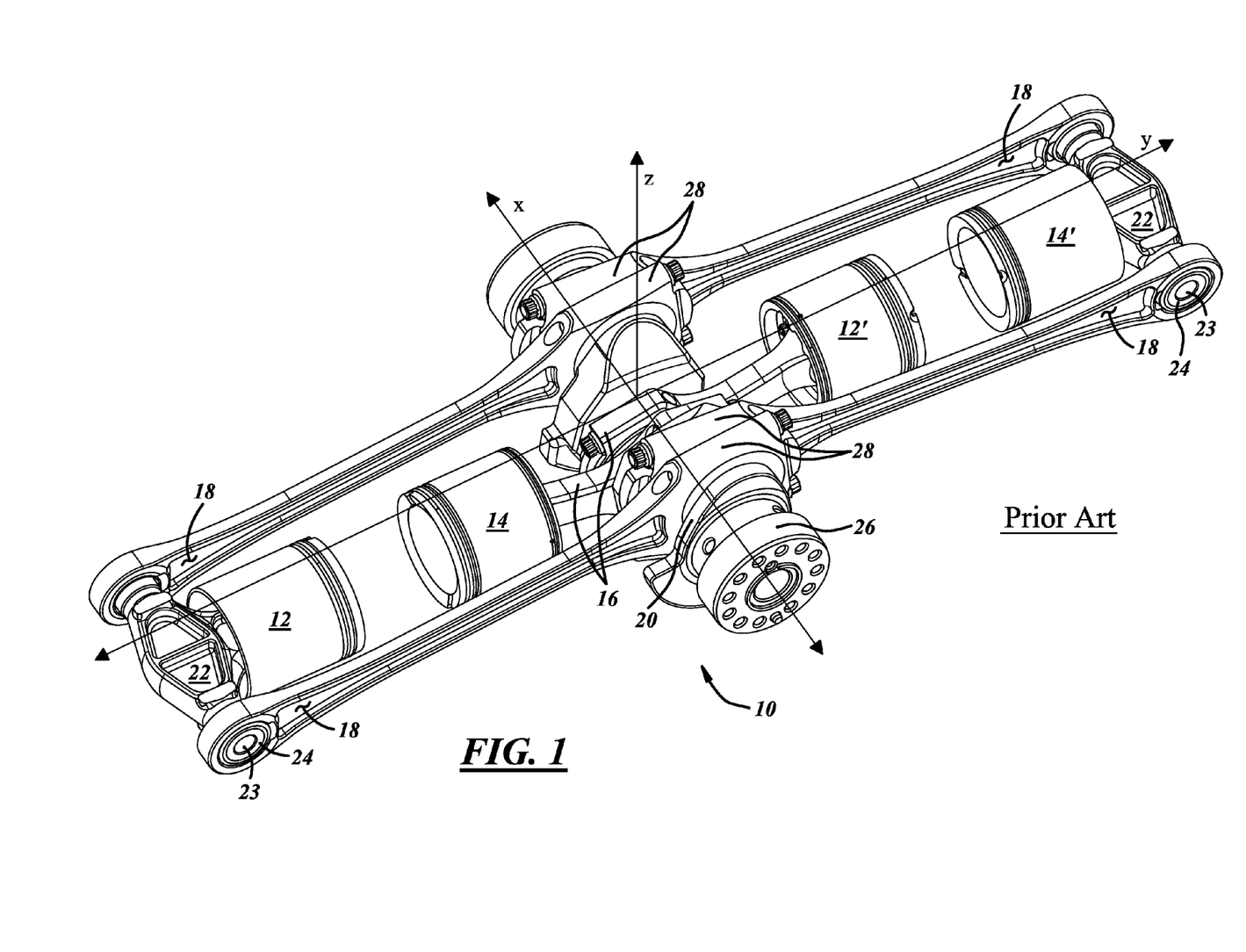
FIG. 1 illustrates an example configuration of an opposed-piston, opposed-cylinder engine in an isometric view.

An example of an internal combustion engine having connecting rod-to-pin connections is shown in FIG. 1. The engine in FIG. 1 is an opposed-piston, opposed-cylinder (OPOC) engine 10 of the type described in U.S. Pat. Nos. 6,170,443, and 7,434,550, which are incorporated herein by reference.

In the left cylinder (cylinders not shown in FIG. 1) are outer piston 12 and inner piston 14. Outer piston 12 is coupled to crankshaft 20 via two pullrods 18 at a big end of pullrods 18. Pullrods 18 couple to a bridge 22 on a small end of pullrods 18. Inner piston 14 is coupled to crankshaft 20 by a pushrod 16. Pistons 12' and 14' in the right cylinder (not shown) are coupled to crankshaft 20 by pushrod 16 and pullrods 18, respectively. The crankshaft has two main bearings 26, a centrally-located journal bearing (not shown) to which pushrods 16 are coupled, and two offset journals, each one of which has two pullrods 18 coupled thereto.

Bridge 22 reciprocates along the Y axis with virtually no motion in the Z direction. In contrast, the big end 28 of pullrods 18 moves in the Z direction in response to the rotation of crankshaft 20. By virtue of motion of the big end 28 of pullrods 18 in the Z direction, pullrods 18 rock in relation to bridge 22. There is relative motion between a cylindrical pin 23 that extends from bridge 22 and the pullrod 18 into which pin 23 extends. Commonly, a bearing 24 is provided between the inner surface of pullrod 18 and pin 23. Bearing 24 can be a sleeve bearing or needle bearings.

During operation in a two-stroke OPOC, pullrods 18 are almost always in tension and pushrods 16 are almost always in compression. When bearings 24 are sleeve bearings, one side of the sleeve bearing is squeezed between pullrod 18 and pin 23 such that lubricant is squeezed out. Relative movement between the connecting rod and the pin can lead to wear of the bearing surfaces due to a lack of lubrication. Alternatively, bearings 24 are needle bearings. Needle bearings have issues of providing sufficient contact area. Furthermore, there are applications in which needle bearings are not suitable. It is desirable to have a joint between the connecting rod and the pin that depends less on lubrication and is substantially frictionless.

SUMMARY

According to an embodiment of the disclosure, a rocking joint assembly is disclosed in which there is little or no relative motion of the bearing surfaces between the connecting rod and the pin associated with a reciprocating element. The assembly includes a connecting rod having a big end coupled to an eccentric journal of a crankshaft and a small end coupled to a reciprocating element via a non-circular pin. The connecting rod has a rod bearing surface with a radius of curvature substantially equal to the distance between the bearing surface and a central axis of the eccentric journal. A surface of the pin that rocks on the rod bearing surface, i.e., a pin bearing surface, has a radius of curvature smaller than the radius of curvature of the rod bearing surface. In some embodiments, the connecting rod includes a main body and an end cap with the rod bearing surface being part of the end cap. The end cap is coupled to the main body of the connecting rod via bolts.

Alternatively, the connecting rod includes a main body, a bearing element that includes the rod bearing surface, and an end cap. The bearing element is held in place by the end cap. The end cap is secured to the main body via bolts or other suitable connection scheme. The pin bearing surface rocks on the rod bearing surface in response to crankshaft rotation.

In one embodiment, the connecting rod is a pullrod, the rod bearing surface is concavely curved, and the pin bearing is convexly curved. In some embodiments, the reciprocating element is a piston coupled to a bridge and the pin is a cross pin extension of the bridge. The radius of curvature of the pin bearing surface of the connecting rod is greater than a minimum radius and the minimum radius is based at least on material properties and surface finish of the pin and rod bearing surfaces and a peak force that the rocking joint is designed to transmit. In some embodiments, the radius of curvature of the surface of the pin that rides on the bearing surface is at a maximum at a center of the surface of the pin and the radius of curvature decreases monotonically as a function of the local force and the distance away from near the center of the surface. The radius of curvature of the pin bearing surface varies along the surface of the pin bearing surface and the radius of curvature is based on maintaining acceptable Hertzian pressures at peak forces that the rocking joint is designed to transmit. Adjusting the radius of curvature of the bearing surface of the pin exactly to the local necessary radius, i.e., the smallest radius possible that is sufficient for the local peak design forces, has the advantage that the width of the rocking joint is minimized. In some embodiments, the connecting rod is a pushrod; the bearing surface is convexly curved; and the surface of the pin that rides on the bearing surface can be convexly curved, concavely curved, or a combination of convexly curved and concavely curved portions. The concavely curved portions of the pin bearing surface have a radius of curvature that is greater than the radius of curvature of the rod bearing surface. The local necessary radius of the pin bearing surface varies along the surface and is based on material properties and surface finish of the rod- and pin-bearing surfaces and the local peak force that the rocking joint is designed to transmit.

Also disclosed is a piston- and crank-assembly for an internal combustion engine, including: a crankshaft having at least one eccentric journal, a first reciprocating element coupled to a first component having a first non-circular pin, a second reciprocating element coupled to a second component having a second non-circular pin, and first and second connecting rods each having a big end coupled to an associated eccentric journal of the crankshaft and a small end of the connecting rods coupled to the pins. The connecting rods have rod bearing surfaces that comprise a portion of a cylinder having a radius of curvature substantially equal to a distance between the rod bearing surface and a central axis of the eccentric journal associated with the connecting rod. In some applications, the first and second reciprocating elements are first and second crossheads and the assembly further includes: a cylinder liner having a first piston and a second piston in an opposed arrangement with tops of the first and second pistons facing each other and arranged to reciprocate within the cylinder liner, a first pushrod coupled to the first piston on a first end of the first pushrod and coupled to the first crosshead on a second end of the first pushrod, and a second pushrod coupled to the second piston on a second end of the second pushrod and coupled to the second crosshead on a second end of the second pushrod.

In other applications: the first reciprocating element is a first piston disposed in a first cylinder liner; the second reciprocating element is a second piston disposed in a second cylinder liner; the first connecting rod is a first pullrod; the second connecting rod is a second pullrod; the first reciprocating element is a first bridge; the second reciprocating element is a second bridge; the first and second pullrods are predominantly under tension during the operation of the engine; and the rod bearing surfaces are concave. The assembly further includes: a third piston disposed in the first cylinder liner and in an opposed arrangement with respect to the first piston, a fourth piston disposed in the second cylinder liner and in an opposed arrangement with respect to the second piston, a third connecting rod coupling the third piston to one of the eccentric journals of the crankshaft with the connecting rod-to-piston connecting via a third non-circular pin, and a fourth connecting rod coupling the fourth piston to one of the eccentric journals of the crankshaft with the connecting rod-to-piston connecting via a fourth non-circular pin. The third and fourth connecting rods are pushrods that are primarily in compression during operation of the engine. The third and fourth connecting rods have a big end coupled to eccentric journals of the crankshaft and a small end having rod bearing surfaces on which the third and fourth non-circular pins ride, respectively. The pin bearing surfaces on the third and fourth connecting rods are: convexly curved, concavely curved, or mixed: have a portion that is convexly curved and a portion that is concavely curved. The local radius of the pin bearing surface varies along the surface and is based at least on material properties and surface finish of the rod- and pin bearing surfaces and the local peak force that the rocking joint is designed to transmit.

The rod bearing surfaces of the first and second connecting rods—pullrods—are concavely curved and the pin bearing surfaces of the pins that ride on the rod bearing surfaces are convexly curved with a radius of curvature less than the radius of curvature of the first and second connecting rod bearings.

In some embodiments, the radius of curvature of pin bearing surfaces is substantially constant. For pullrods, the radius of curvature is greater than a minimum radius based on material properties and surface finish of the pin- and rod-bearing surfaces and the peak force that the connecting rod-to-pin connection is designed to transmit. For pushrods sections in which the pin bearing surface is concave, to be compact, the pin radius is as large as possible while maintaining acceptable Hertzian pressures. Furthermore, the radius of curvature must be greater than that of the rod bearing surface which rocks against the pin bearing surface. For convexly-curved sections of the pin bearing surface in a pushrod bearing, compactness is achieved by a radius of curvature as small as possible while maintaining acceptable Hertzian pressures.

According to an embodiment of the disclosure, a rocking joint assembly is disclosed in which there is little or no relative motion of the bearing surfaces between the connecting rod and the pin associated with a reciprocating element. The assembly includes a connecting rod having a big end coupled to an eccentric journal of a crankshaft and a small end coupled to a reciprocating element via a non-circular pin. The connecting rod has a rod bearing surface with a radius of curvature substantially equal to the distance between the bearing surface and a central axis of the eccentric journal. For pullords, a pin bearing surface has a radius of curvature smaller than the radius of curvature of the rod bearing surface. For pushrods, the rod bearing surface is convex. The joint can be made compact when the pin bearing surface is also convex. A concave bearing surface is, by contrast, less compact, but has greater load carrying capacity. The radius of curvature for a concave bearing surface must be greater than the radius of curvature for the convex rod bearing surface. In some embodiments, the pulling connecting rod includes a main body and an end cap with the bearing surface being part of the end cap. The end cap is coupled to the main body of the connecting rod via bolts, pins, or other connectors.

Alternatively, the connecting rod includes a main body, a bearing element that includes the rod bearing surface, and an end cap. The rod bearing element is held in place by the end cap. The end cap is secured to the main body via bolts. The pin rocks on the rod bearing surface in response to crankshaft rotation or in response to a moving element to which the connecting rod is coupled.

Also disclosed is an internal combustion engine including a cylinder liner, a pair of pistons disposed in the cylinder liner in an opposed arrangement with tops of the pistons facing each other, a pushrod coupled to each piston at a first end of the pushrod, guide surfaces provided for each pullrod with a second end of the pushrod riding on the guide surfaces and the guide surfaces are substantially parallel with an axis of the cylinder, a pullrod coupled to each of the pushrods with a second end of the pushrod coupled to a first end of the pullrod, and a crankshaft having two main bearing journals, a first eccentric journal, and a second eccentric journal. A second end of a first of the pullrods is coupled to the first eccentric journal and a second end of a second of the pullrods is coupled to the second eccentric journal.

A joint between the second end of the pushrod and the first end of the pullrod is a rocking joint with a concavely-curved bearing surface on the pullrod mating with a convexly-curved bearing surface of a non-cylindrical pin coupled to the second end of the pushrod. A radius of curvature of the concavely-curved rod bearing surface is substantially equal to the distance between the rod bearing surface and a central axis of the off-center eccentric journal. The convexly-curved pin bearing surface has a radius of curvature less than the radius of curvature of the concavely-curved rod bearing surface. In one alternative, the convexly-curved pin bearing surface rides on the concavely-curved rod bearing surface in a rocking fashion substantially avoiding sliding motion between the two surfaces. In another alternative, a joint between the second end of the pushrod and the first end of the pullrod is a sliding joint with a cylindrical pin coupled to the second end of the pushrod and a cylindrical opening provided on the first end of the pullrod to accommodate the cylindrical pin wherein the pin rotates back and forth with respect to the cylindrical opening thereby causing relative movement. The first eccentric journal is displaced from the second eccentric journal in the range of 150 to 180 degrees of revolution of the crankshaft. In some embodiments, the second pullrod comprises a vee on an end of the pullrod coupled to the crankshaft and the vee couples to the crankshaft at the second eccentric journal and a third eccentric journal; the first eccentric journal is located between the second and third eccentric journals; and the vee in the second pullrod is sufficiently deep and wide to permit rotation of components coupling the first pullrod to the crankshaft without interference between the first and second pullrods.

BRIEF DESCRIPTION OF THE DRAWINGS

FIG. 7' shows a top view of the bearing element of FIGS. 5-7;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 2:
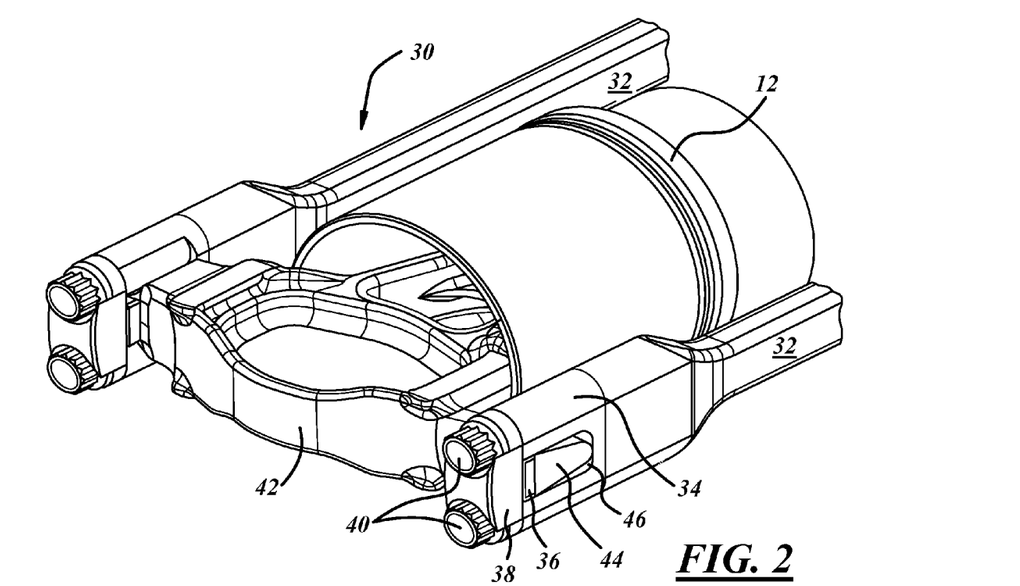
FIG. 2 is an isometric view of a rocking joint according to an aspect of the present disclosure.

An isometric view of a portion of an opposed-piston, opposed-cylinder engine is illustrated in FIG. 2 highlighting components involved in a rocking joint 30, according to an embodiment of the disclosure. An outer piston 12 from the left cylinder (not shown) is coupled to pullrods via a bridge 42. The pullrods include: a pullrod main body 32, a center element 34, a bearing element 36, and an end cap 38, all held together via bolts 40. Alternatively, studs with a nut are used in place of bolts 40. Bridge 42 has cross-pin extensions 44 extending outwardly toward the pullrods. Details of the rocking surfaces are discussed below.

Figure 3:
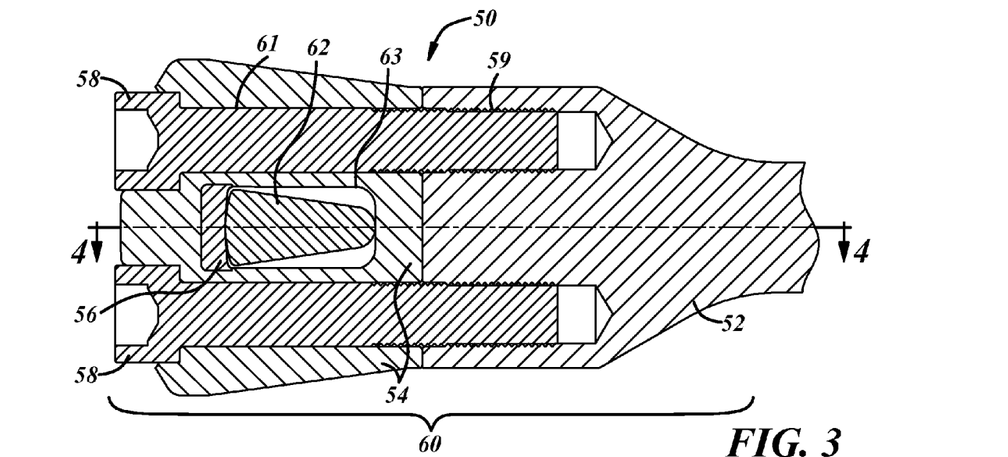
FIGS. 3 and 4 are cross-sectional views of one embodiment of the rocking joint.
Figure 4:
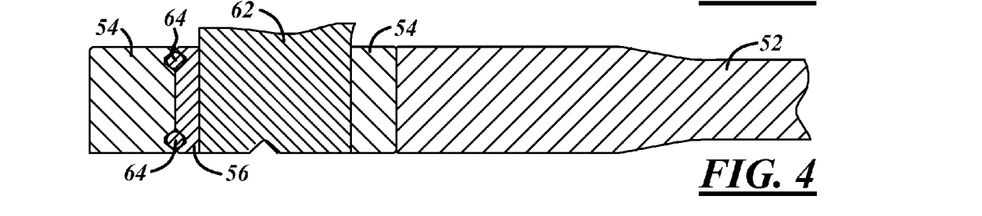

A cross section of an alternative embodiment of a rocking joint 50 is shown in FIG. 3. A pullrod 60 includes: a main body 52, an end cap 54, a bearing element 56, and bolts 58. A cross-extension pin 62, which is part of a bridge coupled to the piston (neither the bridge or the piston are shown in FIG. 3), engages with an opening 63 in end cap 54 and rides, or rocks, on a bearing surface of bearing element 56. Bolts 58 are threaded at an end of the bolt away from the head of the bolt. Threads at 59 engage with main body 52 of connecting rod 52. In the region 61 of bolt 58, the external surface of the bolt pilots end cap 54. A cross section of the rocking joint of FIG. 3 is shown in FIG. 4. Bearing element 56 is held in position with respect to end cap 54 and pin 62 via balls 64 which are placed in dimples provided in end cap 54 and bearing element 56. When bolts 58 (not visible in FIG. 4) are tightened, balls 64 retain bearing element 56 in place. To allow the bridge with extension pin 62 to bend, the surface of bearing element 56 that sits against a surface of opening 63 is convexly curved.

Figure 25:
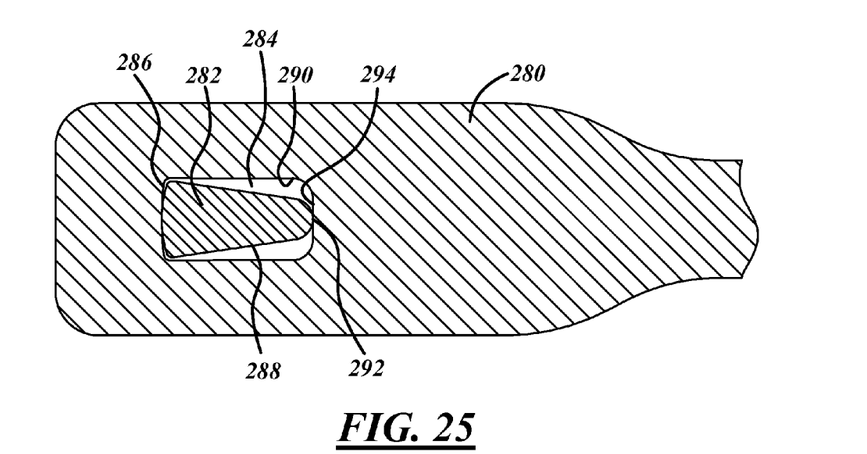
FIG. 25 is an alternative embodiment of a pullrod.

An alternative embodiment of a pullrod 280 is shown in FIG. 25. A pin 282 rocks within an opening 284 defined in pullrod 280. In such embodiment, there is no separate bearing element. Instead the rod bearing surface is a surface of opening 284 where the rod bearing surface and pin bearing surface interact at rocking joint 286. In such embodiment, no end cap is used thereby obviating bolt connections. Furthermore, without a separate bearing element, balls, or other keepers, are also obviated. The bending of the bridge with extension pin is compensated by the flexibility of the long pullrods. In yet another alternative, a pullrod has a separate bearing element that is placed within the opening and the pullrod has no end cap.

Figures 5, 6, 7:
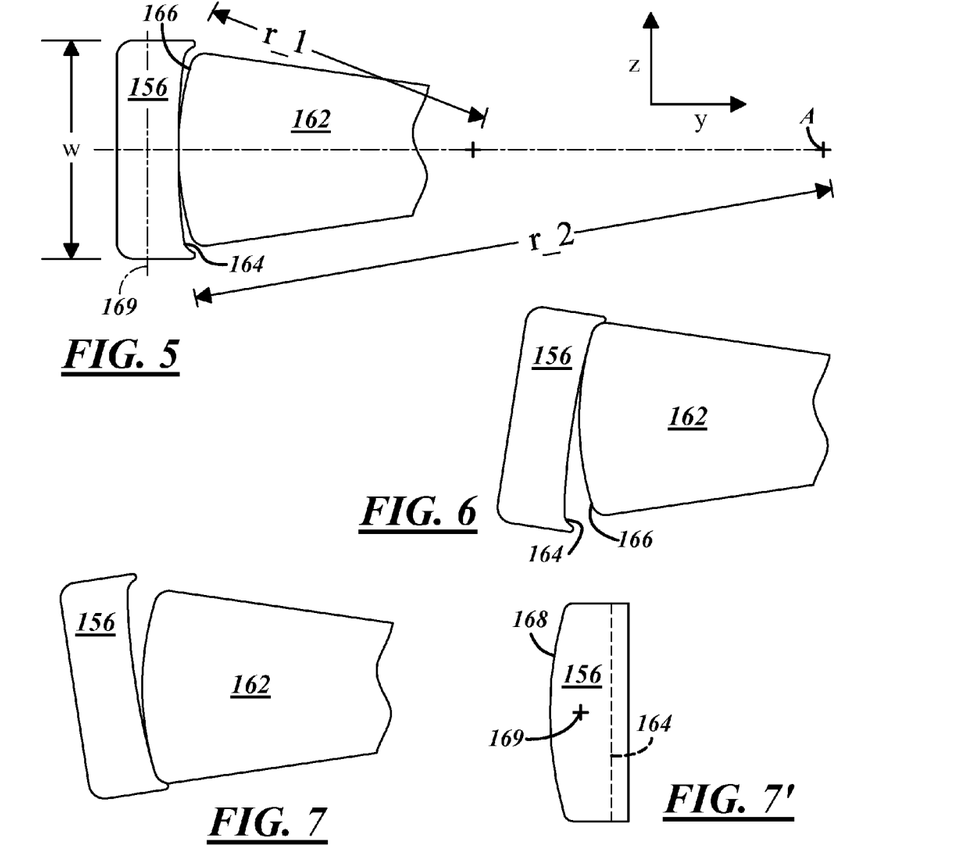
FIGS. 5-7 are details of a rocking joint in neutral and extreme positions.

A portion of a rocking joint is shown in an exaggerated form in FIGS. 5, 6, and 7. A pin 162, which is part of a bridge or other connector between the piston and connecting rod, has a pin bearing surface 166 on which a rod bearing surface 166 of bearing element 156 rocks. During engine operation, pin 162 reciprocates in the Y direction and the connecting rod reciprocates in the Y direction and moves in the Z direction as well. Rod bearing surface 164 of bearing element 156 rocks on rod bearing surface 166 of pin 162. Pin bearing surface 166 is a convexly-curved surface forming a portion of a cylinder with a radius of curvature of $r\_1$. In the embodiment shown in FIGS. 5, 6, and 7, pin bearing surface 166 has a constant radius. Alternatively, the radius of curvature can vary along the surface. The magnitude of the radius of curvature of pin bearing surface 166 is discussed below. Concavely-curved rod bearing surface 164 of bearing element 156 is a portion of a cylinder having a radius of curvature of $r\_2$, in which $r\_1$ is less than $r\_2$. The value of $r\_2$ is the distance from the rod bearing surface to the center of the crank pin (crank pin not shown, but illustrated as being located at A). As will be discussed below, the value of $r\_1$ is determined at least based on the properties of the materials of bearing element 156 and pin 162 as well as the maximum force for which the joint is designed to transmit.

In FIG. 6, bearing element 156 is shown at one extreme position, in which bearing element is tilted upwards. The force at the point of contact between bearing element 156 and pin 162 is substantially perpendicular to the pin- and rod-surfaces in all positions. The other extreme position, in which bearing element 156 is tilted downwards, is shown in FIG. 7. The rocking joint in FIGS. 5-7 are exaggerated in that the radii of curvature, $r\_1$ and $r\_2$, are much smaller than would be found in most practical situations. Such small radii allow visualization of the curvature on the bearing element 156 and pin 162. In rocking joint of FIG. 3, bearing element 56 rocks about 5 degrees with respect to pin 62. Thus, the surfaces of bearing element 56 and pin 62 that are in contact appear nearly flat.

In embodiments with a bearing element 36 such as illustrated in FIG. 2, a back side of bearing element 36 that sits against a surface of opening 46 has a convexly curved surface, such as can be seen in FIG. 7'. Bearing element 156 in FIG. 7' is a top view of bearing element 156 of FIGS. 5-7. An axis 169 parallel to a long direction of bearing element is shown in FIG. 5. A center of the radius of curvature of surface 168 in FIG. 7' is roughly parallel with axis 169 (visible as a point in FIG. 7'). The curvature of surface 168 is provided to compensate for any bending of the piston pin (or crosshead pin) during engine operation.

Relative motion between surfaces of the rocking joint is prevented when the forces are normal to the portions of the surfaces in contact. However, in some situations, there are modest side forces. The curvature of the bearing element (156 of FIGS. 5-7) may be modified so that the resultant force is perpendicular to the bearing surfaces. However, in many practical devices, such as an internal combustion engine as shown in FIG. 1, the side forces are negligible. Furthermore, the magnitude of the side forces varies with engine speed. Thus, any accommodation for the side forces is a compromise at all speeds except for the design speed. In most embodiments, no accommodation is made for the side forces as the magnitude of the side forces is sufficiently small that no sliding occurs.

Figure 8:
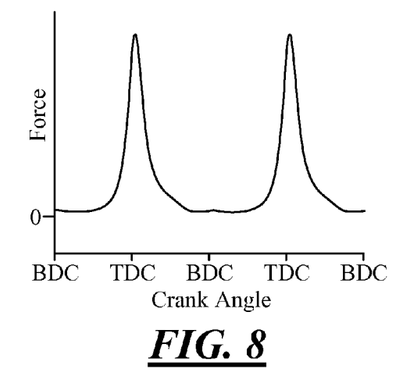
FIG. 8 is a graph of cylinder pressure as a function of crank angle degree for a two-stroke engine.

To ensure that the rocking joint can carry the forces, the radius of curvature of pin 162 can be made larger. However, the penalty in doing so is that the width of the joint, W, is wider. It is desirable to have the joint as narrow as practical so that the connecting rod is compact. In one embodiment, surface 164 has a constant radius, $r\_1$, which is defined by the peak force that the joint is designed to transmit. In FIG. 8, the force at the joint is plotted as a function of crank angle degree for the highest cylinder pressure condition in the engine. The pressure peaks near TDC due to compression in the cylinder and from pressure increases due to combustion. However, the pressure falls off sharply on either side of the peak pressure. Thus, having a constant radius, $r\_1$, that is defined by the peak cylinder pressure causes the radius of curvature to be greater than necessary at crank angle positions away from the peak pressure. In an alternative embodiment, the radius of curvature of the surface on the pin is not constant, but instead varies as a function of crank angle (or could be defined in relation to the connecting rod angle, b). The non-constant radius is chosen so that the pressure is smaller than an acceptable Hertz pressure, which is defined by the materials of the roller components at the line of contact between the pin and the bearing element. The minimum local radius, $r\_1$ as a function of b, i.e., the embodiment in which $r\_1$ is not constant and varies as a function of connecting rod angle, b. The minimum local radius on the pin is determined based on the maximum acceptable Hertz pressure, Hp. A characteristic radius for the joint, r, is defined as $$1/r = 1/r\_1 + 1/r\_2.$$

Figure 9:
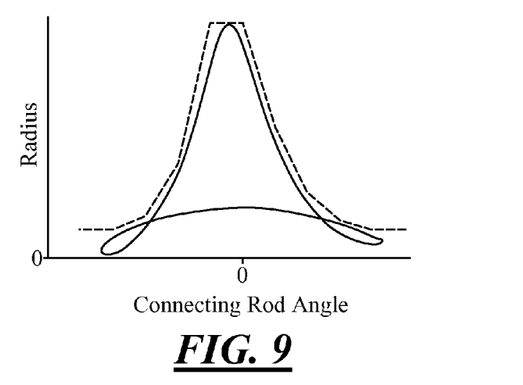
FIG. 9 is graph of the minimum radius of curvature for the pin for one embodiment as a function of connecting rod angle.

And, $Hp=[(F*C)/(r*L)]^0.5$ where F is the force carried by the joint, C is a material constant based on the materials of the pin and bearing element, and L is the contact length. The resulting $r\_1$ as a function of the connecting rod angle is shown in the solid line in FIG. 9. The dashed line in FIG. 9 is a safe minimum radius that may be employed. By providing a non-constant radius according to the dashed line in FIG. 9, the width of the joint can be made smaller than would be the case if $r\_1$ were a constant defined by the peak force expected to be encountered.

Referring to FIG. 3, bearing element 56 is a separate element from end cap 54. Alternatively, end cap 54 includes bearing element 56. Advantages of bearing element 56 being separate are ease in machining the curved surface and allowing material to be selected that may not be desirable for end cap 54. Advantages of having bearing element 56 integral with end cap 54 include reduced part count and improved ease of assembly.

Figure 10:
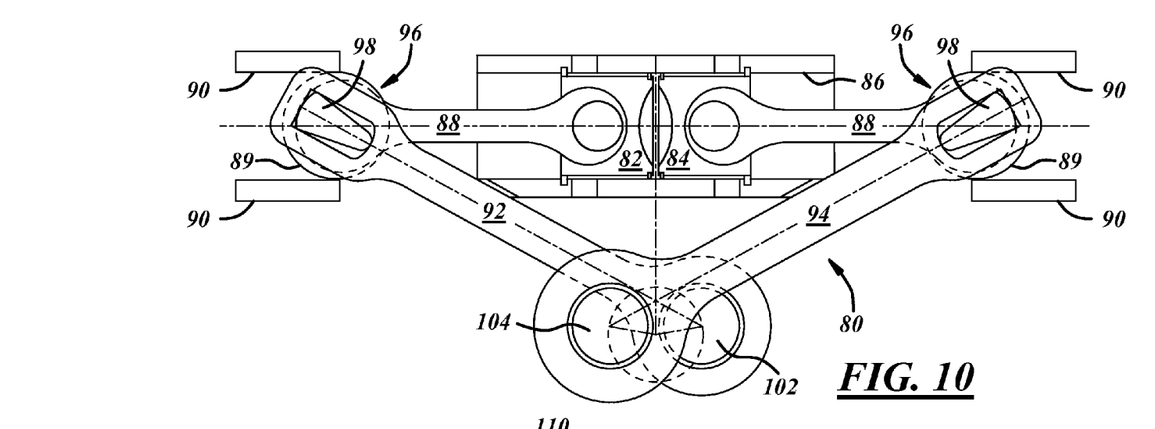
FIGS. 10 and 11 are views of an opposed piston engine having a rocking joint according to an embodiment of the disclosure.
Figure 11:
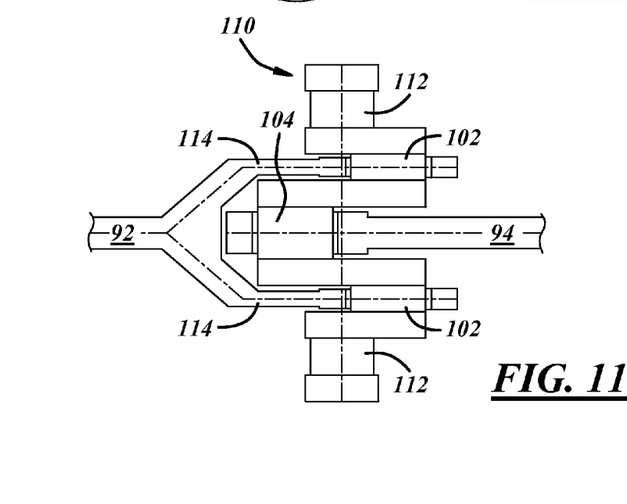

An opposed-piston engine 80 is shown in which rocking joints are employed is shown in FIG. 10. Opposed pistons 82 and 84 reciprocate within cylinder 86. Pistons 82 and 84 are coupled to bridges 88 on a first end of bridges 88. Second ends 89 of bridges 88 are crossheads that reciprocate along guide surfaces 90. Second ends 89 couple to pullrods 92 and 94 via rocking joints 96. Pins 98 that integrate with bridges 88 rock on a bearing surface of pullrods 92 and 94. Pullrod 94 connects to a journal 104 of a crankshaft. Pullrod 92 is forked at an end that couples to the crankshaft. One of the journals 102 to which pullrod 92 is coupled is visible in the FIG. 10. An alternative view of engine 80 in FIG. 11 shows crankshaft 110. Crankshaft 110 has main journals 112 and two eccentric journals 102 to which forked pullrod 92 is coupled. Forked pullrod 92 has two forks 114 that couples to journals 102. Pullrod 94 couples to centrally-located journal 104. Journals 102 are offset on either side of centrally-located journal 104. The width between forks 114 and the distance of forks 114 from journals 102 are selected so that journal 104 and a bearing cap (not shown) associated with pullrod 94 clear with respect to forks 114 during rotation of crankshaft 110.

Figure 12:
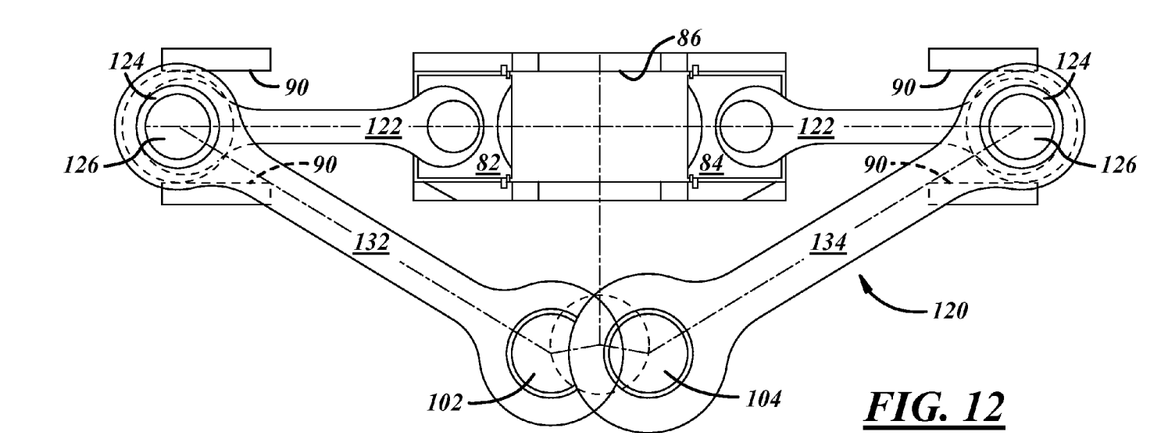
FIGS. 12 and 13 are views of an opposed piston engine according to an alternative embodiment of the disclosure.
Figure 13:
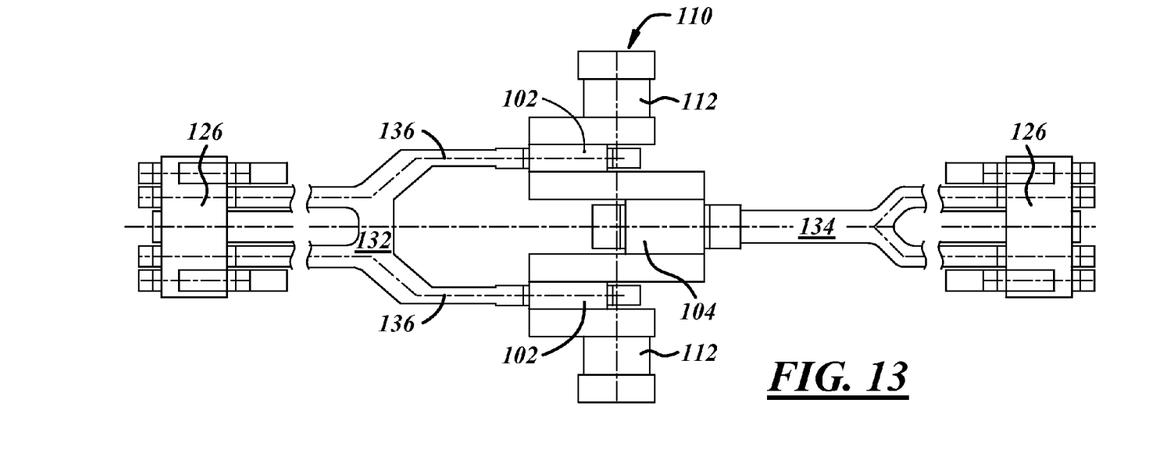

The opposed-piston engine 80 of FIGS. 10 and 11 is shown in FIGS. 12 and 13 as an engine 120 with conventional bearings in which there is relative movement of the surfaces within the bearing. Pistons 82 and 84 reciprocate in cylinder 86 and are coupled to pushrods 122 at a first end of bridges 122. A second end of pushrods 122 ride on guide surfaces 90 and are coupled to pullrods 132 and 134 with conventional sleeve bearings 124. Sleeve bearings 124 are placed over pins 126. The bearing surfaces move relative to each other. In an alternative embodiment, needle bearings can be substituted for sleeve bearing 124. FIG. 13 shows crankshaft 110 with forks 136 of pullrod 132 coupled to journals 102 and pullrod 134 coupled to journal 104. Pullrods 132 and 134 are forked at the end coupled with pushrods 122.

Figure 14:
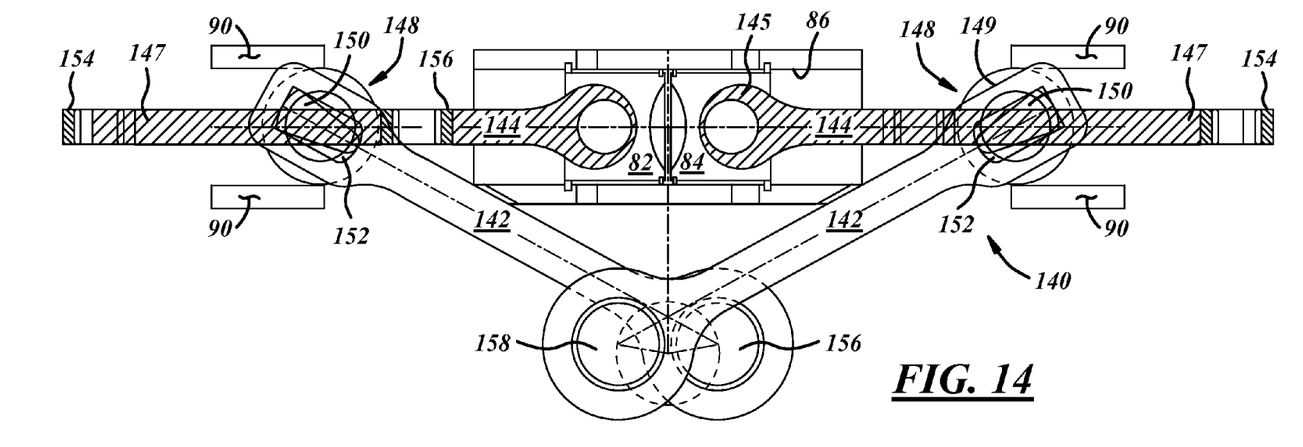
FIGS. 14 and 15 are views of an opposed piston engine according to an alternative embodiment of the disclosure.

Yet another embodiment of an opposed-piston engine 140 has opposed pistons 82 and 84 reciprocating in cylinder 86, as shown in FIG. 14. Bridges 144 are coupled to pistons 82 and 86 on a first end 145 and to a pullrod 142 at a center location on bridges 144. In the embodiment shown in FIG. 14, a rocking joint 148 is formed between pullrod 142 and bridge 144. Pullrod 144 has a pin 150 having a curved surface that rocks upon a curved surface in an opening 152 in bridge 144. A rounded surface 149 coupled to bridge 144 rides on guide surfaces 90. A first roller 154 is placed proximate a second end 147 of bridge 144. A second roller 154 is placed proximate bridge 144 on the other side of bridge 144. Pullrods 142 are coupled to journals 156 and 158 of the crankshaft (mostly not visible in FIG. 14).

Figure 15:
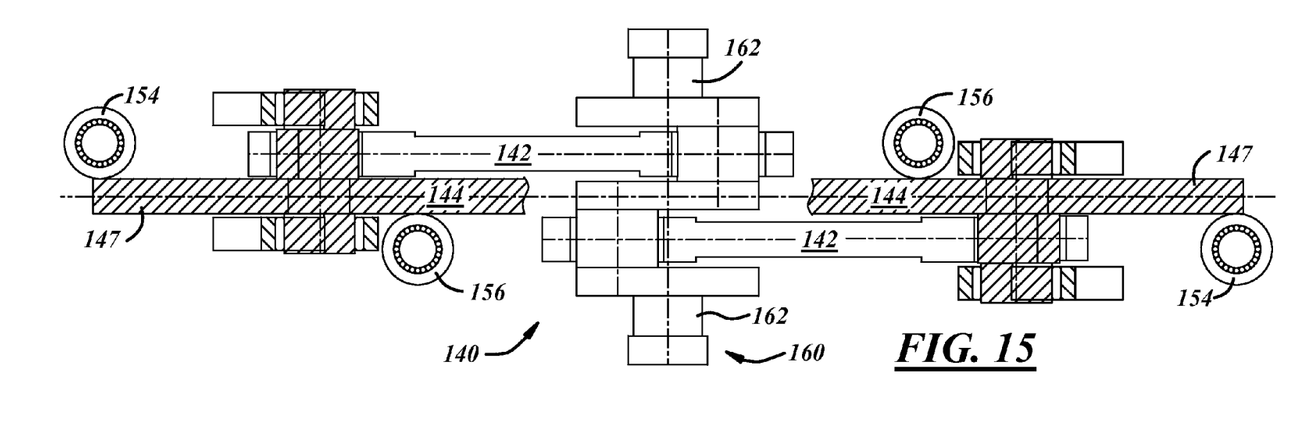

In FIG. 15, an alternate view of engine 140 is shown in which a crankshaft 160 has two main journals and two eccentric journals (the eccentric journals not visible in FIG. 15 as they are occluded by the connection of pullrods 142 to crankshaft 160). A torque developed in bridges 144 due to the offset nature of their coupling to pullrods 142 is borne by rollers 154 and 156.

Figures 16, 17, 18:
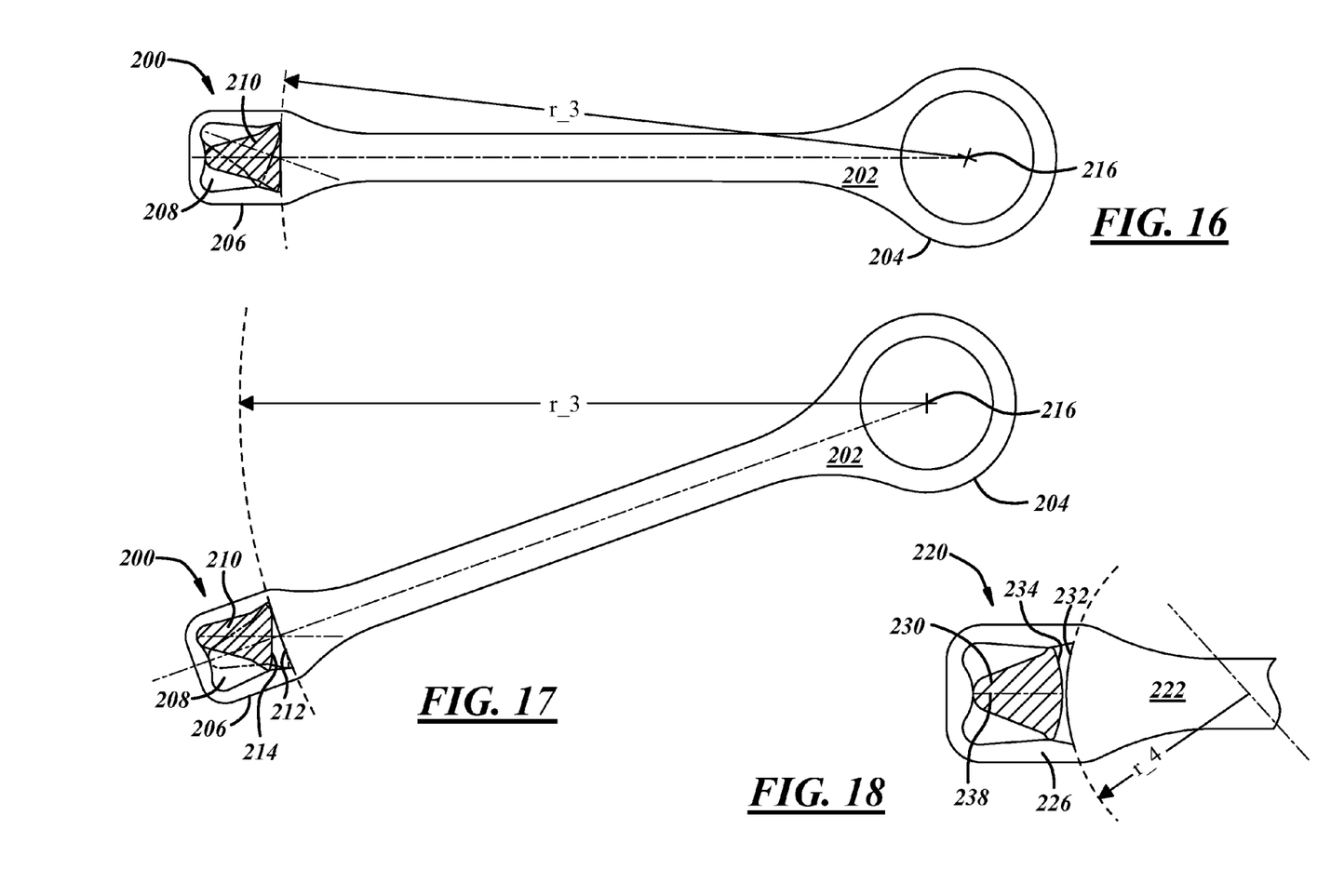
FIGS. 16 and 17 are views of a pushrod rocking joint according to an embodiment of the disclosure, shown in a neutral and an extreme position, respectively.
FIG. 18 is a detail of a rocking joint in a pushrod.

The embodiments described above relate to connecting rods in tension, i.e., pullrods. The present disclosure also relates to connecting rods in compression, i.e., pushrods, such as shown in FIGS. 16 and 17. A rocking joint 200 is shown between a pushrod 202 and a non-circular pin 210. Pushrod 202 has a big end 204 that couples with an eccentric journal of a crankshaft (not shown). A small end 206 has an opening 208 in which pin 210 rocks. The rod bearing surface 212 (shown in FIG. 17; not separately visible in FIG. 16) of pushrod 202 and pin bearing surface 214 of pin 210 are both convex. The rocking joint is shown in FIG. 16 in a neutral position and in one of the extreme positions in FIG. 17. Bearing surface 212 has a radius of curvature of r_3, which is the distance between surface 212 and a central axis 216 of big end 204 of pushrod 202. Central axis 216 is the center about which the relative movement between pushrod 202 and the eccentric journal (not shown) occurs. However, in alternative embodiments, the moving element is not part of a crankshaft and instead is a moving element with a potentially complicated trajectory. Nevertheless, there is a center of relative motion at the joint and the radius of curvature of the rod bearing surface is based on a distance from that center location.

An exaggerated version of a rocking joint 220 in a pushrod 222 is shown in FIG. 18 in which the radius of curvature, r_4, associated with bearing surface 232 and the radius of curvature of bearing surface 234 are much smaller than would be typical. In the embodiment in FIG. 18, pin 230 is contained within an opening in an end of pushrod 222. A bearing surface 232 on pushrod 222 is convexly curved. A bearing surface 234 on pin 230 is also convexly curved. Such a situation, i.e., with the rocking joint having two convex surfaces can be made compact, but can carry less force than a concavely-curved rocking joint. The radius of curvature of bearing surface 234 may be a constant and smaller than r_4. Alternatively, the radius of curvature of bearing surface 234 peaks near an axis of symmetry 238 of pin 230 and decreases monotonically away from the axis of symmetry.

Figure 19:
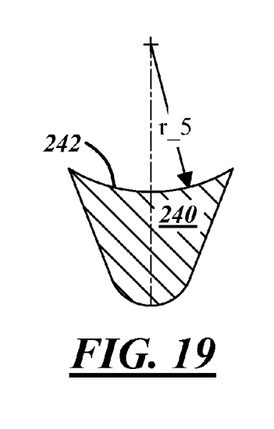
FIGS. 19, 21, and 23 are alternative pin bearing surface shapes.
Figure 20:
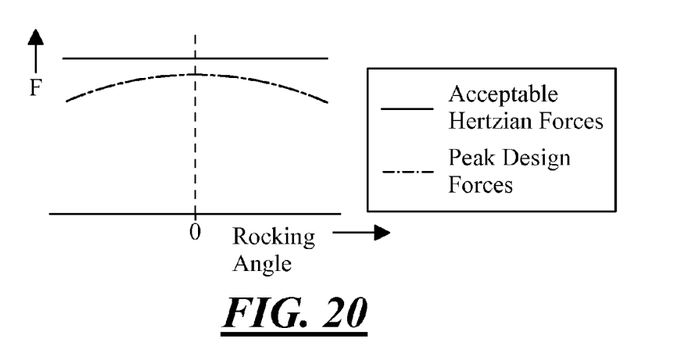
FIGS. 20, 22, and 24 are graphs of forces transmitted by the bearing as a function of rocking angle related to FIGS. 19, 21, and 23, respectively.

An example of a pin 240 with a concave bearing surface 242 is shown in FIG. 19. In FIG. 20, a graph of the force being transmitted in the joint as a function of rocking angle is shown. As surface 242 has a constant radius of curvature, r_5, the acceptable Hertzian forces, solid line in FIG. 19, is a constant. If the peak design pressures are shown as dash-dot curve 244, as one example, the peak design forces in the joint are less than the acceptable Hertzian forces at all rocking angles and the rocking joint will survive so long as the peak design forces are not exceeded.

Figure 21:
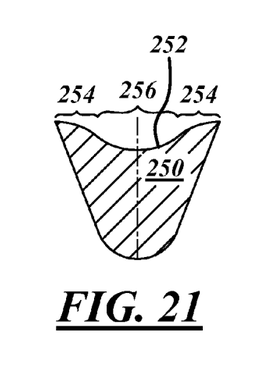

In another example shown in FIG. 21, pin 250 has a bearing surface 252 that has a concave portion 256 and convex portions 254 outboard of portion 256. The acceptable Hertzian forces for such a configuration are higher at rocking angles associated with portion 256 and drop off dramatically for rocking angles associated with portions 254. As long as the peak design forces for the particular application are similar to the example shown in FIG. 22, the surface 252 is appropriate.

Figure 23:
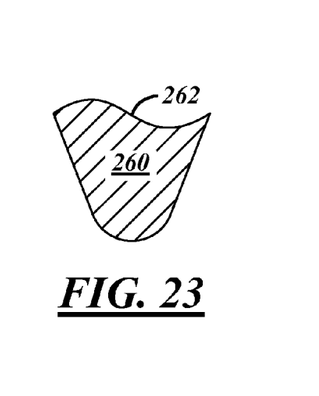
Figure 24:
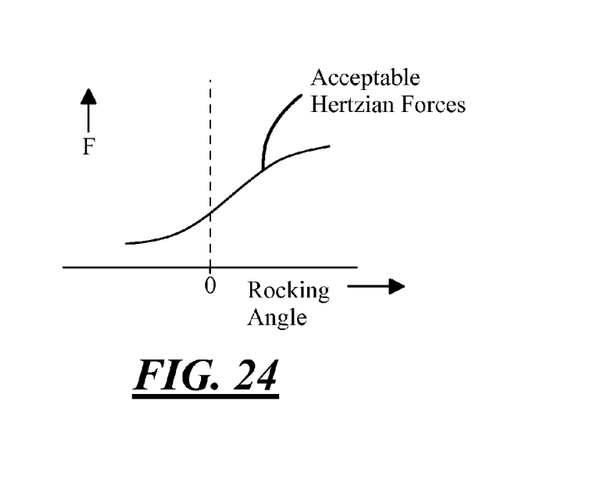

In yet another example in FIG. 23, a pin 260 has a bearing surface 262 that has a convex section near one end a concave section near another end which provides acceptable Hertzian forces limit as shown in FIG. 24. Most of the pin-bearing-surface examples shown have a symmetric profile; but pin 260 in FIG. 23 does not. The profile of the pin bearing surface is selected to maintain acceptable Hertzian pressures and may assume a complicated profile if the desired peak local forces have a complicated profile.

In FIG. 25, an embodiment of a pullrod 280 is shown in which there is no separate end cap or bearing element. Instead an opening 284 is defined in an end of pullrod 280. A rod bearing surface 286 is formed on a surface of opening 284. Pin 282 rocks within opening 284. Although pullrod 280 is in tension almost exclusively, it is desirable to avoid clearance between pin 282 and other surfaces of opening 284. Side flanks 288 of pin 282 and side surfaces 290 of opening 284 are shaped as "gear teeth" with permanent gliding contact. Because there are minimal forces acting in this direction, the friction associated with the side of pin 282 gliding on side surface 290 is negligible. Additionally, tip 292 of pin 282 glides along a top surface 294 of opening 284. Side surfaces 290 and top surface 294 of opening 284 as well as flanks 288 and tip 292 of pin are designed using "gear profiles."

The embodiments described are also applicable to internal combustion engines besides opposed-piston engines, whether two or four cycle, as well as other machines with a connecting rod coupling a reciprocating element with a moving element. By providing a joint that rocks rather than allowing relative movement of the surfaces, lubrication of the joint is obviated. Or, if a slight amount of sliding occurs due to imperfection in the rocking surfaces, the presence of lubrication is useful, but less necessary than in a sliding joint.

Figure 22:
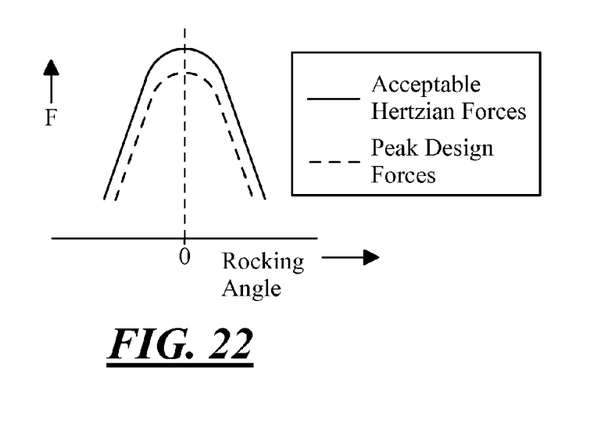
Figure 26:
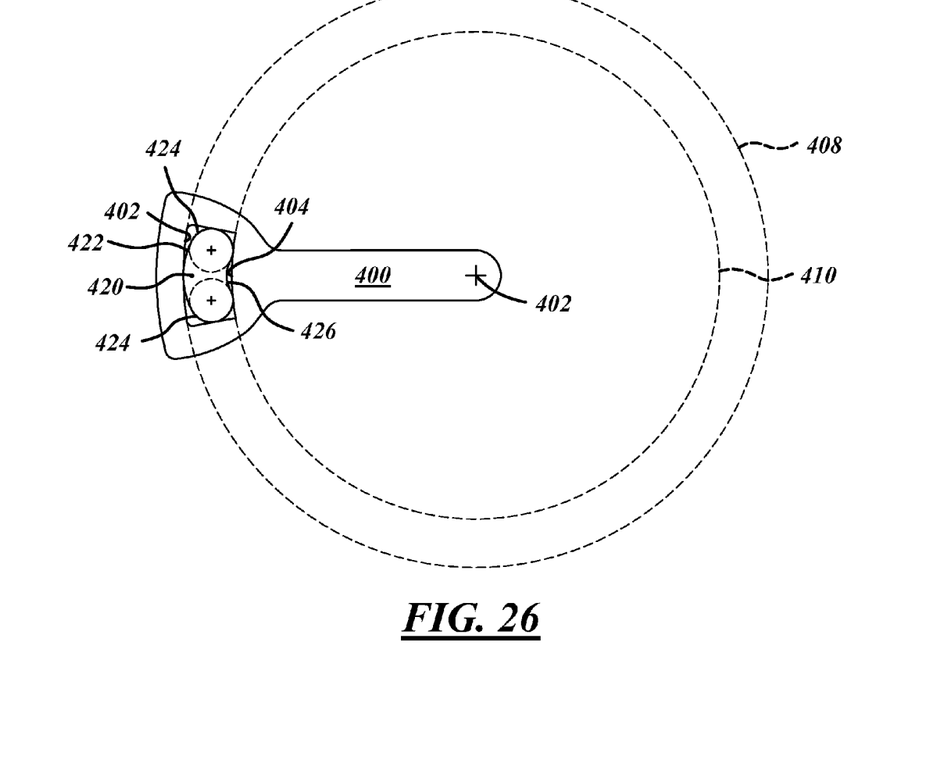
FIG. 26 illustrates a pullrod having primary and secondary bearing surfaces.

Although there are engine configurations in which the pullrods are primarily in tension and pushrods are primarily in compression, there may be operating conditions in which the pullrod briefly experiences compression and the pushrod briefly experiences tension. In such a load reversal, the primary rocking joint does not carry the force and instead the opposite side of the pin carries the force. In FIG. 26, a pullrod 400 is shown having both a primary rod bearing surface 402 and a secondary rod bearing surface 404. The radius of curvature of primary rod bearing surface 402 is determined from X, the center of the eccentric journal (eccentric journal not shown) to which pullrod 400 couples, i.e., a portion of circle 410. And, secondary rod bearing surface 404 is coincident with circle 410. In internal combustion engines, the forces borne by the rocking joint are greatest in the center position, such as that shown in FIG. 26, e.g., near top dead center of the piston. The forces fall off very quickly away from the center position, as shown in FIG. 22. Thus, the radius of curvature can be much tighter away from the surface of the pin that contacts the rod bearing surface at the center position. In FIG. 26, the radius of curvature of pin 420 on a primary pin bearing surface 422 is greater in the center region and smaller at end regions 424. The radius of curvature in regions 424 is determined at least by the geometry of primary and secondary rod bearing surfaces 402 and 404, respectively. Upon load reversal, the bearing surface switches from the primary rocking joint (primary rod bearing surface 402 and primary pin bearing surface 422) to the secondary rocking joint (secondary rod bearing surface 404 and secondary pin bearing surface 426) and vice versa during a subsequent load reversal. The magnitude of forces when the secondary joint is bearing the load is much lower than the peak forces that the primary rocking joint carries. Thus, a tight radius of curvature such as that in regions 424 is capable of carrying the load without exceeding the Hertzian pressures.

Although the present disclosure has been shown in the context of internal combustion engines having a connecting rod between a crankshaft and a reciprocating member, the present disclosure applies also to situations with a connecting rod between a reciprocating member and a moving element having any type of complicated movement. In such situations, the shape of the bearing surface associated with the connecting rod has a radius equal to the distance of the surface to the center of the connection between the connecting rod and the moving element. Also, the shape of the pin bearing surface of the reciprocating element is based on the peak design forces to be transmitted through the rocking joint as a function of rocking angle. Also, the terms Hertzian pressures and Hertzian forces have been employed; these relate through area of the contact surface of the bearing surfaces.

In actuality in many practical embodiments, the radii of curvature of the various curved surfaces are such that they would appear as nearly flat in the Figures. For purposes of illustration, the radii of curvature are smaller than would be practical, such as in FIGS. 5-7, 7', 10, 11, 14-19, 21, 23, 25, and 26.

The embodiments described are also applicable to other internal combustion engines besides opposed-piston engines, whether two or four cycle, as well as other machines with a reciprocating element and a rotating element. By providing a joint that rocks rather than allowing relative movement of the surfaces, lubrication of the joint is obviated in the rocking joint. Lubrication is useful, however, in keeping the friction negligible in the other surfaces in which there is gliding.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A rocking-joint assembly, comprising:
   a connecting rod having a first end coupled to a portion of a moving element and a second end coupled to a reciprocating element via a non-circular pin wherein:
   the connecting rod has a rod bearing surface with a radius of curvature substantially equal to the distance between the rod bearing surface and a center of the portion of the moving element; and
   the pin has a pin bearing surface that rocks on the rod bearing surface.

2. The assembly of claim 1 wherein the pin bearing surface rocks on the rod bearing surface in response to movement of the connecting rod.

3. The assembly of claim 1 wherein the connecting rod defines an opening in the second end and the rod bearing surface comprises one of the surfaces of the opening.

4. The assembly of claim 1 wherein:
   the connecting rod comprises a main body and an end cap with the rod bearing surface being part of the end cap; and
   the end cap is coupled to the main body of the connecting rod.

5. The assembly of claim 1 wherein the connecting rod defines an opening in the second end, the assembly further comprising:
   a bearing element that sits against a surface of the opening wherein the rod bearing surface is formed on a side of the bearing element distal from the opening and a surface of the bearing element sitting against the surface is convexly curved.

6. The assembly of claim 1 wherein: the connecting rod comprises a main body, an end cap secured to the main body, an opening defined in the connecting rod, and a bearing element placed within the opening with the rod bearing surface formed on a side of the bearing distal from the opening, and a surface of the bearing element proximate the surface is convexly curved.

7. The assembly of claim 1 wherein:
   the connecting rod is a pullrod;
   the moving element is a crankshaft and the portion is an eccentric journal of the crankshaft;
   the connecting rod is coupled to the eccentric journal at the first end;
   the center of the portion of the moving element is a central axis of the eccentric journal;
   the rod bearing surface is concavely curved; and
   the pin bearing surface is convexly curved.

8. The assembly of claim 1 wherein the reciprocating element is a piston coupled to a bridge and the pin is part of a cross-pin extension of the bridge.

9. The assembly of claim 7 wherein the radius of curvature of the pin bearing surface is greater than a minimum radius and the minimum radius is based at least on material properties and surface finish of the rod- and pin bearing surfaces and a peak force that the rocking joint is designed to transmit.

10. The assembly of claim 7 wherein the radius of curvature of the pin bearing surface varies along the surface of the pin bearing surface and the radius of curvature at each location is based on maintaining acceptable Hertzian pressures at peak local forces that the rocking joint is designed to transmit.

11. The assembly of claim 1 wherein:
    the connecting rod is a pushrod;
    the rod bearing surface is convexly curved; and
    the pin bearing surface of the pin, that rides on the rod bearing surface, is convexly- or concavely-curved, and the local radius of the pin bearing surface varies along the surface and is based at least on material properties and surface finish of the rod bearing surface and the pin bearing surface and the local peak force that the rocking joint is designed to transmit.

12. The assembly of claim 11 wherein the radius of curvature of the pin bearing surface varies along the surface of the pin bearing surface and the radius of curvature at each location is based on maintaining acceptable Hertzian pressures at peak local forces that the rocking joint is designed to transmit.

13. The assembly of claim 1 wherein the pin has a tip opposite the pin bearing surfaces and flanks and a profile of the tip and the flanks are based on gear teeth profiles.

14. A piston-and-crank assembly, comprising:
    a crankshaft having an eccentric journal;
    a reciprocating element coupled to a component having a non-circular pin; and
    a connecting rod having a big end coupled to the eccentric journal of the crankshaft and a small end coupled to the pin, wherein the connecting rod has a primary rod bearing surface that comprises a portion of a cylinder having a radius of curvature substantially equal to a distance between the primary rod bearing surface and a central axis of the eccentric journal.

15. The assembly of claim 14 wherein:
    the piston-and-crank assembly is part of a two-stroke engine;
    the connecting rod is primarily in compression;
    the pin has a primary pin bearing surface on which the primary rod bearing surface rocks;
    the primary pin bearing surface and the primary rod bearing surface comprise a primary rocking joint;
    radius of curvature of the primary pin bearing surface varies along the surface of the primary pin bearing surface; and
    the local radius of curvature is at least partially based on maintaining acceptable Hertzian pressures at peak local forces that the primary rocking joint is designed to transmit.

16. The assembly of claim 15, further comprising:
a secondary rod bearing surface on the connecting rod which is located opposite the primary rod bearing surface and the secondary rod comprises a portion of a cylinder having a radius of curvature substantially equal to a distance between the secondary rod bearing surface and a central axis of the eccentric journal;
a secondary pin bearing surface on the pin which is located opposite the primary pin bearing surface wherein the secondary rod bearing surface rocks on the secondary pin bearing surface when the connecting rod is in tension and a radius of curvature of the secondary pin bearing surface is defined by the first and second rod bearing surfaces.

17. The assembly of claim 14 wherein:
the connecting rod is primarily in tension;
the pin has a primary pin bearing surface on which the primary rod bearing surface rocks;
the primary pin bearing surface and the primary rod bearing surface comprise a primary rocking joint;
radius of curvature of the primary pin bearing surface varies along the surface of the primary pin bearing surface; and
a local radius of curvature is at least partially based on maintaining acceptable Hertzian pressures at peak local forces that the primary rocking joint is designed to transmit.

18. The assembly of claim 17, further comprising:
a secondary rod bearing surface on the connecting rod which is located opposite the primary rod bearing surface and the secondary rod comprises a portion of a cylinder having a radius of curvature substantially equal to a distance between the secondary rod bearing surface and a central axis of the eccentric journal;
a secondary pin bearing surface on the pin which is located opposite the primary pin bearing surface wherein the secondary rod bearing surface rocks on the secondary pin bearing surface when the connecting rod is in tension and a radius of curvature of the secondary pin bearing surface is defined by the first and second rod bearing surfaces.

19. The assembly of claim 14 wherein the eccentric journal is a first eccentric journal, the reciprocating element is a first reciprocating element, the component is a first component, the non-circular pin is a first non-circular pin, the connecting rod is a first connecting rod, and the crankshaft has a second eccentric journal, the assembly further comprising:
a second reciprocating element coupled to a second component having a second non-circular pin; and
a second connecting rod having a big end coupled to the second eccentric journal and a small end coupled to the second pin wherein the second connecting rod has a rod bearing surface that comprises a portion of a cylinder having a radius of curvature substantially equal to a distance between the rod bearing surface and a central axis of the second eccentric journal.

20. The assembly of claim 19 wherein the first and second reciprocating elements are first and second crossheads, the assembly further comprising:
a cylinder liner having a first piston and a second piston in an opposed arrangement with tops of the first and second pistons facing each other and arranged to reciprocate within the cylinder liner;
a first bridge coupled to the first piston on a first end of the first bridge and coupled to the first crosshead on a second end of the first bridge; and
a second bridge coupled to the second piston on a second end of the second bridge and coupled to the second crosshead on a second end of the second bridge.

21. The assembly of claim 20 wherein:
the first reciprocating element is a first piston disposed in a first cylinder liner;
the second reciprocating element is a second piston disposed in a second cylinder liner;
the first connecting rod is a first pullrod;
the second connecting rod is a second pullrod;
the first piston couples to the pullrod via a first bridge that comprises the first pin;
the second piston couples to the pullrod via a second bridge that comprises the second pin;
the first and second pullrods are predominantly under tension during the operation of the engine; and
the rod bearing surfaces are concave.

22. The assembly of claim 21, further comprising:
a third piston disposed in the first cylinder liner and in an opposed arrangement with respect to the first piston;
a fourth piston disposed in the second cylinder liner and in an opposed arrangement with respect to the second piston;
a first pushrod coupling the third piston to one of the eccentric journals of the crankshaft with the connecting rod-to-piston connecting via a third non-circular pin; and
a second pushrod coupling the fourth piston to one of the eccentric journals of the crankshaft with the connecting rod-to-piston connecting via a fourth non-circular pin.

23. The assembly of claim 22 wherein:
the first and second pushrods are primarily in compression during operation of the engine;
the first and second pushrods have a big end coupled to eccentric journals of the crankshaft and a small end having rod bearing surfaces on which the third and fourth non-circular pins ride, respectively;
the bearing surfaces on the third and fourth connecting rods are convexly curved; and
bearing surfaces on the third and fourth non-circular pins and the pin bearing surfaces of the pins, that rides on the rod bearing surfaces, are convexly- or concavely-curved, and the local radius of the pin bearing surface varies along the surface and is based at least on material properties and surface finish of the rod- and pin bearing surfaces and the local peak force that the rocking joint is designed to transmit.

24. An internal combustion engine, comprising:
a cylinder liner;
a pair of pistons disposed in the cylinder liner in an opposed arrangement with tops of the pistons facing each other;
a pushrod coupled to each piston at a first end of the pushrod;
guide surfaces provided for each pullrod with a second end of the pushrod riding on the guide surfaces and the guide surfaces are substantially parallel with an axis of the cylinder;
a pullrod coupled to each of the pushrods with a second end of the pushrod coupled to a first end of the pullrod;
a crankshaft having two main bearing journals, a first eccentric journal, and a second eccentric journal wherein: a second end of a first of the pullrods is coupled to the first eccentric journal; and a second end of a second of the pullrods is coupled to the second eccentric journal;
a joint between the second end of the pushrod and the first end of the pullrod is a rocking joint with a concavely-curved bearing surface on the pullrod mating with a convexly-curved bearing surface of a non-cylindrical pin coupled to the second end of the pushrod;

a radius of curvature of the concavely-curved bearing surface on the pullrod is substantially equal to the distance between the bearing surface and a central axis of the off-center eccentric journal;

the convexly-curved surface has a radius of curvature less than the radius of curvature of the concavely-curved surface; and the convexly-curved surface rides on the concavely-curved surface in a rocking fashion substantially avoiding sliding motion between the two surfaces.

25. The engine of claim 24 wherein a joint between the second end of the pushrod and the first end of the pullrod is a sliding joint with a cylindrical pin coupled to the second end of the pushrod and a cylindrical opening provided on the first end of the pullrod to accommodate the cylindrical pin wherein the pin rotates back and forth with respect to the cylindrical opening thereby causing relative movement.

26. The engine of claim 24 wherein:

the second pullrod comprises a vee on an end of the pullrod coupled to the crankshaft and the vee couples to the crankshaft at the second eccentric journal and a third eccentric journal;

the first eccentric journal is located between the second and third eccentric journals; and the vee in the second pullrod is sufficiently deep and wide to permit rotation of components coupling the first pullrod to the crankshaft without interference between the first and second pullrods.

27. A piston-and-crank assembly, comprising:

a crankshaft having an eccentric journal;

a reciprocating element coupled to a component having a non-circular pin;

a connecting rod having a big end coupled to the eccentric journal of the crankshaft and a small end coupled to the non-circular pin of the component wherein the connecting rod has a primary rod bearing surface that comprises a portion of a cylinder having a radius of curvature substantially equal to a distance between the primary rod bearing surface and a central axis of the eccentric journal;

a cylinder liner having a piston disposed therein; and a bridge coupled between the piston and the reciprocating element.

* * * * *